United States Patent
Han et al.

(10) Patent No.: US 8,615,199 B2
(45) Date of Patent: Dec. 24, 2013

(54) METHOD OF TRANSMITTING INTERFERENCE INFORMATION SIGNAL IN WIRELESS COMMUNICATION SYSTEM

(75) Inventors: Jong Young Han, Anyang-si (KR); Doo Hyun Sung, Anyang-si (KR); Han Gyu Cho, Anyang-si (KR); Jae Hoon Chung, Anyang-si (KR); Hyung Ho Park, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 12/920,605

(22) PCT Filed: Mar. 3, 2009

(86) PCT No.: PCT/KR2009/001038
§ 371 (c)(1),
(2), (4) Date: Sep. 2, 2010

(87) PCT Pub. No.: WO2009/110730
PCT Pub. Date: Sep. 11, 2009

(65) Prior Publication Data
US 2011/0014909 A1  Jan. 20, 2011

Related U.S. Application Data

(60) Provisional application No. 61/033,026, filed on Mar. 3, 2008, provisional application No. 61/033,027, filed on Mar. 3, 2008.

(30) Foreign Application Priority Data

Feb. 27, 2009  (KR) .................. 10-2009-0016765

(51) Int. Cl.
*H04B 1/00* (2006.01)
(52) U.S. Cl.
USPC ..... 455/63.1; 455/522; 455/422.1; 455/456.1
(58) Field of Classification Search
USPC ..................... 455/63, 456.1–456.6
See application file for complete search history.

(56) References Cited

U.S. PATENT DOCUMENTS

| | | | |
|---|---|---|---|
| 2008/0045260 A1* | 2/2008 | Muharemovic et al. | 455/522 |
| 2008/0057934 A1* | 3/2008 | Sung et al. | 455/422.1 |
| 2008/0064432 A1 | 3/2008 | Park et al. | |
| 2008/0175185 A1* | 7/2008 | Ji et al. | 370/318 |
| 2008/0233967 A1* | 9/2008 | Montojo et al. | 455/452.2 |
| 2009/0028112 A1* | 1/2009 | Attar et al. | 370/332 |

FOREIGN PATENT DOCUMENTS

| | | |
|---|---|---|
| CN | 101137236 A | 3/2008 |
| KR | 10-2006-0040949 A | 5/2006 |
| KR | 10-0765892 B1 | 10/2007 |
| KR | 10-2007-0112935 A | 11/2007 |
| KR | 10-2008-0022652 A | 3/2008 |

\* cited by examiner

*Primary Examiner* — Fayyaz Alam
*Assistant Examiner* — Mohammed Rachedine
(74) *Attorney, Agent, or Firm* — Birch, Stewart, Kolasch & Birch, LLP

(57) ABSTRACT

A method of transmitting an interference information signal in a wireless communication system is provided. The method includes receiving a neighbor sounding signal from a mobile station (MS) in a neighbor cell, obtaining an interference information signal based on the neighbor sounding signal and transmitting the interference information signal to a neighbor base station (BS), the neighbor BS which is a BS in the neighbor cell.

9 Claims, 14 Drawing Sheets

METHOD OF TRANSMITTING INTERFERENCE INFORMATION SIGNAL IN WIRELESS COMMUNICATION SYSTEM

This application is the National Phase of PCT/KR2009/001038 filed on Mar. 3, 2009, which claims priority under 35 U.S.C. 119(e) U.S. Provisional Application Nos. 61/033,026 and 61/033,027, both were filed on Mar. 3, 2008, and under U.S.C. 119(a) to Patent Application No. 10-2009-0016765 filed in Republic of Korea, on Feb. 27, 2009, all of which are hereby expressly incorporated by reference into the present application.

TECHNICAL FIELD

The present invention relates to wireless communications, and more particularly, to a method of transmitting an interference information signal in a wireless communication system.

BACKGROUND ART

Wireless communication systems are being widely deployed in order to provide various kinds of communication services, such as voice or data. The object of the wireless communication systems enables a number of users to perform reliable communication with each other irrespective of their position and mobility. However, a wireless channel has an abnormal characteristic, such as path loss, noise, shadowing, fading due to multipath, intersymbol interference (ISI), or the Doppler effect due to mobility of user equipment. Accordingly, a variety of techniques for overcoming the abnormal characteristic of the wireless channel and increasing the reliability of wireless communication are being developed.

Meanwhile, the wireless communication system is a cellular system. The cellular system is configured to divide a service region into a number of cells each served communication services in order to overcome a restriction in the service region and a restriction in the number of users accommodated in the service region. However, users placed at the boundary between cells are subject to inter-cell interference because of interference signals generated from neighbor cells. Base stations are also subject to inter-cell interference because of interference signals generated from neighbor cells. Inter-cell interference is one of the major causes to restrict the performance of a wireless communication system. Inter-cell interference may result in the depletion of transmission and reception signals of cell boundary users, a reduction in throughput, transmission power consumption, etc. They cause several problems in the support of various services for cell boundary users, the maintenance of Quality of Service (QoS), and cell coverage. Accordingly, to solve the inter-cell interference problem and to improve the performance of a system become the important requirements of a next-generation wireless communication system. In systems, such as 3rd Generation Partnership Project (3GPP) Long Term Evolution (LTE), Ultra Mobile Broadband (UMB), Institute of Electrical and Electronics Engineers (IEEE) 802.16 (WiMAX), and IEEE 802-20, a variety of techniques for improving the performance of a system by overcoming inter-cell interference are being used.

The IEEE 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter referred to as 'IEEE 802.16e') was completed in 2005 in a format of 'corrigendum'. An IEEE 802.16m which is a new technique standard is being standardized based on the IEEE 802.16e. In the IEEE 802.16m system, the throughput of a cell boundary user is required to be twice that of the IEEE 802.16e system. In order to satisfy the requirement, plenty of parts of the IEEE 802.16e system have to be improved and a method of controlling inter-cell interference also needs to be improved.

Methods of controlling inter-cell interference may differ depending on the requirements and characteristic of a wireless communication system, and the performance thereof may differ. If the system knows interference information such as information about a neighbor cell from which inter-cell interference is generated and information about intensity of the inter-cell interference, the inter-cell interference may be controlled efficiently. Accordingly, there is a need for a method of transmitting an interference information signal for efficiently controlling inter-cell interference.

DISCLOSURE OF INVENTION

Technical Problem

The present invention provides a method of transmitting an interference information signal in a wireless communication system.

Technical Solution

In an aspect, a method of transmitting an interference information signal in a wireless communication system is provided. The method includes receiving a neighbor sounding signal from a mobile station (MS) in a neighbor cell, obtaining an interference information signal based on the neighbor sounding signal and transmitting the interference information signal to a neighbor base station (BS), the neighbor BS which is a BS in the neighbor cell.

In another aspect, a method of controlling interference in a wireless communication system is provided. The method includes receiving an interference information signal from a neighbor BS, receiving an interference control request from the neighbor BS and performing interference control based on the interference information signal.

Advantageous Effects

There is provided a method of transmitting an interference information signal in a wireless communication system. Accordingly, inter-cell interference can be efficiently controlled and the entire performance of a system can be improved.

MODE FOR THE INVENTION

Figure 1:
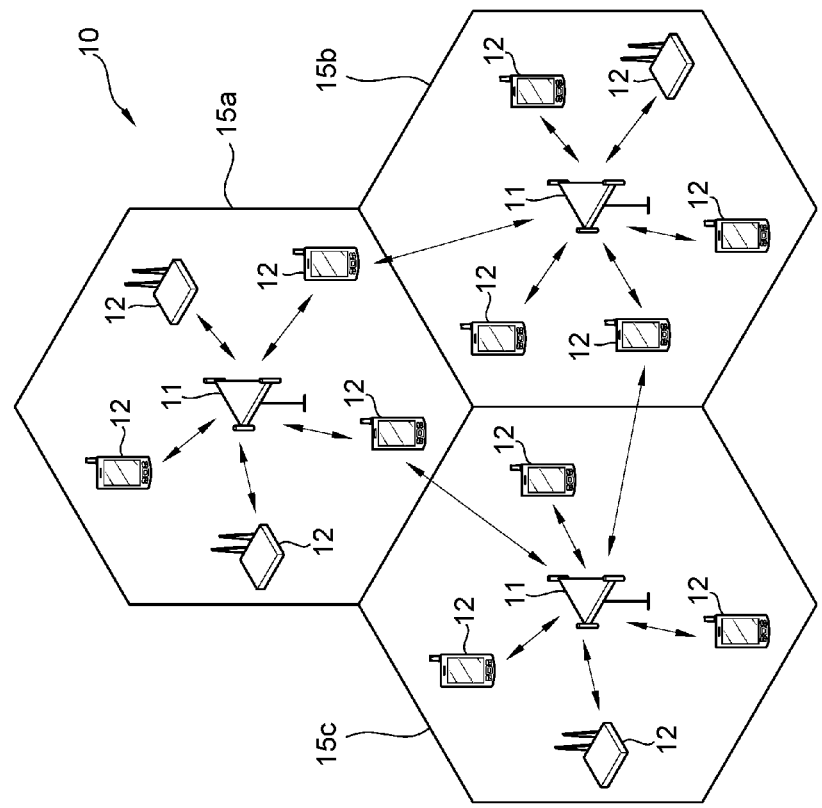
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (generally called 'cells') 15a, 15b, and 15c. Each of the cells may be divided into a number of areas (called 'sectors'). Each of Mobile Stations (MSs) 12 may be fixed or mobile and may be referred to as another terminology, such as User Equipment (UE), a User Terminal (UT), a Subscriber Station (SS), a wireless device, a Personal Digital Assistant (PDA), a wireless modem, or a handheld device. Each of the BSs 11 generally refers to a fixed station which communicates with the MSs 12 and may be referred to as another terminology, such as an evolved-NodeB (eNB), a Base Transceiver System (BTS), or an access point.

Hereinafter, downLink (DL) refers to communication from a BS to an MS, and upLink (UL) refers to communication from the MS to the BS. In DL, a transmitter may be part of the BS and a receiver may be part of the MS. In UL, a transmitter may be part of the MS and a receiver may be part of the BS.

A wireless communication system may use any duplex method, such as a Time Division Duplex (TDD) method, a Frequency Division Duplex (FDD) method, or a Half-duplex FDD (H-FDD) method. In the TDD method, UL transmission and DL transmission are performed at different time while occupying the same frequency band. The TDD method has channel reciprocity which means that the characteristic of an UL channel and the characteristic of a DL channel are almost reciprocal to each other. Accordingly, an MS can predict the characteristic of the UL channel based on the characteristic of the DL channel, and a BS can predict the characteristic of the DL channel based on the characteristic of the UL channel. In the FDD method, UL transmission and DL transmission are simultaneously performed while occupying different frequency bands. In the H-FDD method, UL transmission and DL transmission cannot be simultaneously performed while occupying different frequency bands. That is, in the H-FDD method, UL transmission and DL transmission are performed in different frequency bands and at different time.

A wireless communication system may use any multiple access schemes. The multiple access scheme refers to a method of supporting communication with multiple users by sharing available radio resources. The wireless communication system may use a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). In the wireless communication system, multiple access schemes for UL and DL may differ. For example, SC-FDMA may be used for UL and OFDMA may be used for DL. CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as IEEE 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of Evolved UMTS (E-UMTS) using E-UTRA.

Figure 2:
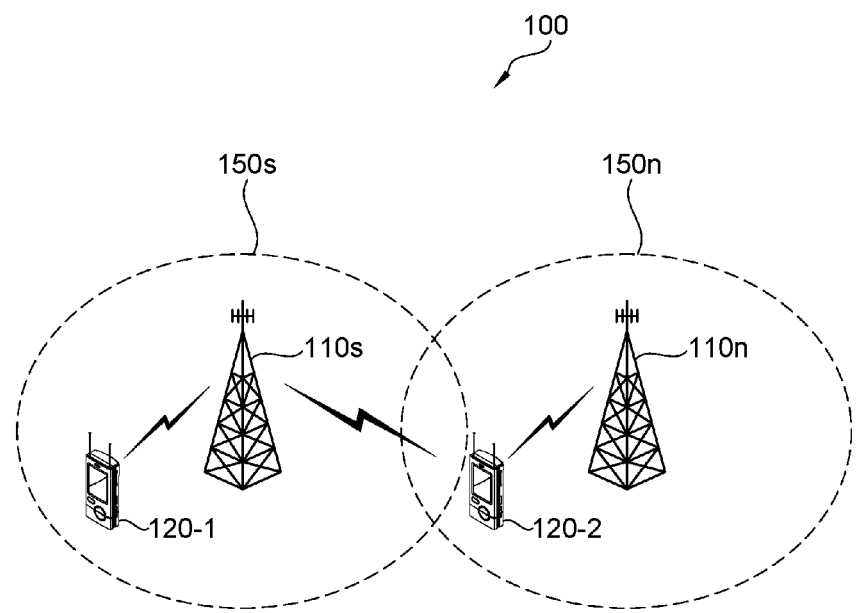
FIG. 2 shows an example of a case where inter-cell interference is generated in a wireless communication system.

FIG. 2 shows an example of a case where inter-cell interference is generated in a wireless communication system.

Referring to FIG. 2, in a wireless communication system 100, a cell to which a first MS 120-1 belongs is called a serving cell 150s. Another cell neighboring the serving cell 150s is called a neighbor cell 150n. A second MS 120-2 belongs to the neighbor cell 150n. A BS belonging to the serving cell 150s is called a serving BS 110s. A BS belonging to the neighbor cell 150n is called a neighbor BS 110n. The first MS 120-1 communicates with the serving BS 110s, and the second MS 120-2 communicates with the neighbor BS 110n. The first MS 120-1 is placed on the edge of the serving cell 150s. The second MS 120-2 is placed at the boundary between the serving cell 150s and the neighbor cell 150n.

From a viewpoint of the second MS 120-2, the neighbor cell 150*n* is a serving cell and the neighbor BS 110*n* is a serving BS. A description is however given on the basis of the first MS 120-1, for convenience of the description. Although only one neighbor cell 150*n* is illustrated, cells neighboring the serving cell 150*s* may be plural.

A BS properly allocates a resource to each of MSs in a cell through scheduling. Here, the resource may be time, frequency, space, or power. In this case, dynamic resource allocation or semi-static resource allocation may be used. Each of the MSs transmits a user signal to the BS using the allocated resource. That is, the serving BS 110*s* allocates a first resource to the first MS 120-1 through scheduling, and the neighbor BS 110*n* also allocates a second resource to the second MS 120-2 through scheduling. The first MS 120-1 transmits a first user signal to the serving BS 110*s* using the first resource, and the second MS 120-2 transmits a second user signal to the neighbor BS 110*n* using the second resource. However, the serving BS 110*s* can receive not only the first user signal transmitted by the first MS 120-1, but also the second user signal transmitted by the second MS 120-2. In the serving BS 110*s*, the second user signal becomes an interference signal.

If the first user signal and the second user signal use different frequency bands, inter-cell interference may not be generated. This is because, in an OFDMA system, there is orthogonality between subcarriers. If the first user signal and the second user signal use the same frequency band, inter-cell interference is generated. It has been described above that the serving BS 110*s* receives one user signal and one interference signal from respective MSs, but this is only illustrative. For example, the serving BS 110*s* may receive user signals or interference signals from a plurality of MSs.

An MS has restricted transmission power as compared with a BS. Further, when an MS placed on the edge of a serving cell, such as the first MS 120-1 transmits a user signal to a serving BS, propagation loss is increased. Accordingly, the serving BS may be greatly interfered by the MS of a neighbor cell, such as the second MS 120-2 placed at the boundary between the serving cell and a neighbor cell. In order to improve the performance of a system, inter-cell interference must be able to be efficiently controlled.

In order to control inter-cell interference, a BS may schedule resources so that inter-cell interference is not generated or minimized. The scheduling method may be a method of the BS controlling the transmission power of an MS or a method of the BS allocating different wireless resources to MSs placed at the boundary between cells. Alternatively, a scheduling method of combining a method of controlling the transmission power of the MS and a method of allocating different wireless resources may be used.

The power loss of a transmission signal increases in an exponential function manner depending on the transmission distance. A BS may increase the transmission power of an MS so that the power loss of a signal transmitted from the MS is compensated for. If the transmission power of the MS is high, however, the amount of interference acting on neighbor cells also increases. Accordingly, the BS may control inter-cell interference by controlling the transmission power of the MS so that only part of the power loss is compensated for with the amount of interference acting on the neighbor cells taken consideration.

If different wireless resources are allocated to MSs placed at the boundary between cells, inter-cell interference may not be generated because a user signal of each MSs is separated. For example, there is a Fractional Time Reuse (FTR) method or a Fractional Frequency Reuse (FFR) method. In the FTR method, each MSs uses the same frequency resource and uses different time. In FFR method, each MSs uses the same time resource and uses different frequency resources. In the FFR method, different frequency resources are used between neighbor cells and the same frequency resource are used between cells which are very far from each other. Accordingly, the frequency resource can be reused spatially. This method may increase the number of channels in a number of cell distributions, so the sufficient number of users can be accommodated.

In order to perform scheduling for controlling inter-cell interference, the serving BS 110*s* must know interference information about inter-cell interference. Interference information may be neighbor cell information about from which neighbor cell is inter-cell interference being generated, MS information about which MS within the neighbor cell is generating the inter-cell interference, frequency band information about from which frequency band is the inter-cell interference being generated, the intensity of interference regarding how strong is the inter-cell interference being generated, etc. In order to acquire interference information, the serving BS 110*s* must know information about an interference channel between the serving BS 110*s* and the second MS 120-2. The serving BS 110*s* may obtain information about the interference channel using a method of obtaining channel information.

A method of a BS obtaining channel information is described below.

The channel state of a wireless communication system continuously changes according to time, space or both. The wireless communication system may differently use subcarrier allocation, a Modulation and Coding Scheme (MCS), the level of encryption, and multiple antenna technique in order to obtain an optimal performance depending on the channel state. Accordingly, the throughput of the system can be increased. In an OFDMA system, there is a big difference in the throughput of the system according to a method of allocating a resource to an MS depending on the channel state. In order to efficiently allocate the resource depending on the channel state, a BS must know channel information.

The BS may acquire UL channel information using a pilot signal within a frequency band which has been allocated in order to transmit data transmitted by an MS. The pilot signal may be transmitted using subcarriers allocated between data subcarriers. The BS may acquire the UL channel information only within the frequency band which has been allocated to the MS for data transmission. This method however becomes problematic when the channel state of the frequency band used by the MS becomes weak or the BS has to change the frequency band used by the MS in order to provide a higher level of service. The BS may not accurately determine a frequency band, an MCS, or the level of encryption because it does not have any UL channel information about other frequency bands.

The BS may not directly measure DL channel information. The BS may receive channel information, feedbacked from the MS, or obtain the DL channel information through a sounding signal transmitted by the MS. A method of a BS obtaining DL channel information in the IEEE 802.16e system is described below.

Figure 3:
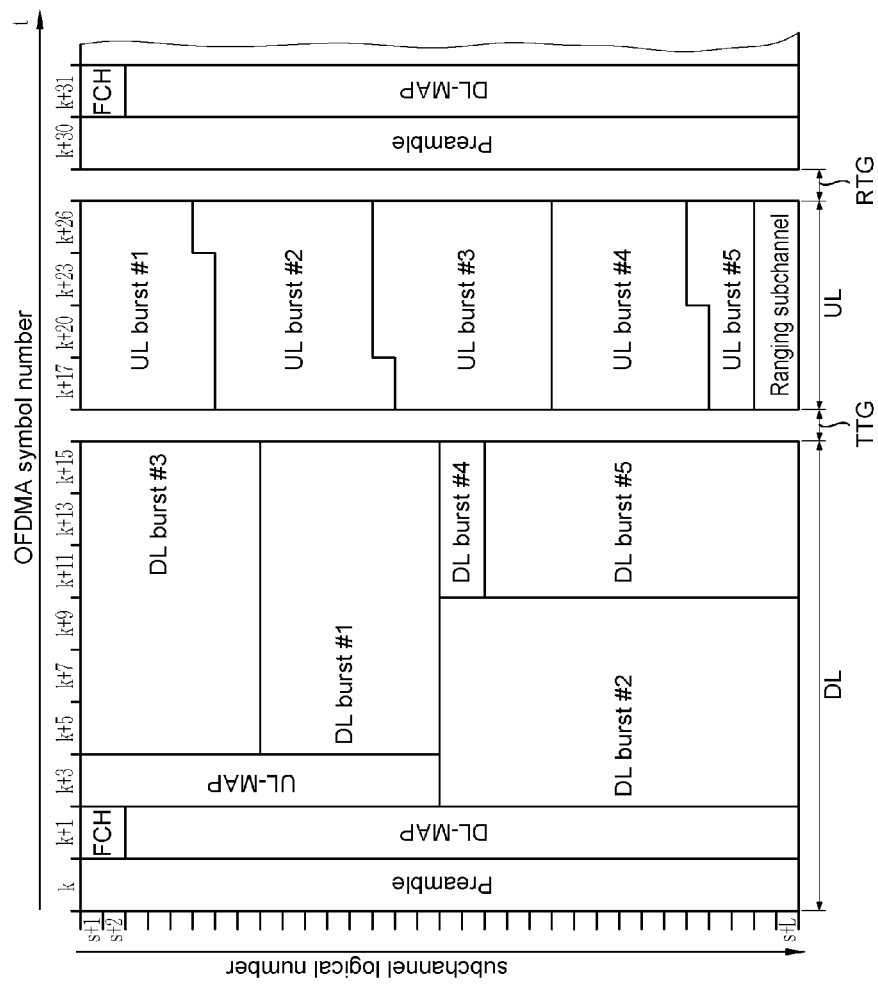
FIG. 3 shows an example of a TDD frame structure in the IEEE 802.16e system.

FIG. 3 shows an example of a TDD frame structure in the IEEE 802.16e system. A frame is a data sequence during a fixed time used by the physical specification. The time axis may be an OFDMA symbol. A logical subchannel includes a plurality of subcarriers. Permutation denotes mapping form a logical subchannel to a physical subcarrier.

Referring to FIG. 3, a frame includes a DL subframe and a UL subframe. The DL subframe is temporally earlier than the UL subframe. The DL subframe starts in the sequence of a preamble, a Frame Control Header (FCH), a DL-MAP, a UL-MAP, and a DL burst region. The UL subframe includes UL bursts. A guard time for dividing the DL subframe and the UL subframe is inserted into the intermediate portion (between the DL subframe and the UL subframe) and the last portion (next to the UL subframe) of the frame. A Transmit/receive Transition Gap (TTG) is a gap between a DL burst and a subsequent UL burst. A Receive/transmit Transition Gap (RTG) is a gap between a UL burst and a subsequent DL burst.

The preamble is used for initial synchronization between a BS and an MS, cell search, a frequency offset, and channel estimation. The FCH includes information about the length of a DL-MAP message and the coding scheme of a DL-MAP.

The DL-MAP is a region where the DL-MAP message is transmitted. The DL-MAP message defines access to a DL channel. It is meant that the DL-MAP message defines indication and/or control information for the DL channel. The UL-MAP is a region where a UL-MAP message is transmitted. The UL-MAP message defines access to a UL channel. It is meant that the UL-MAP message defines indication and/or control information for the UL channel.

The DL burst is a region for transmitting data from the BS to the MS. The UL burst is a region for transmitting data from the MS to the BS.

A fast feedback region may be included in the UL frame. The fast feedback region is allocated for fast UL transmission. A feedback message can be carried on the fast feedback region.

Figure 4:
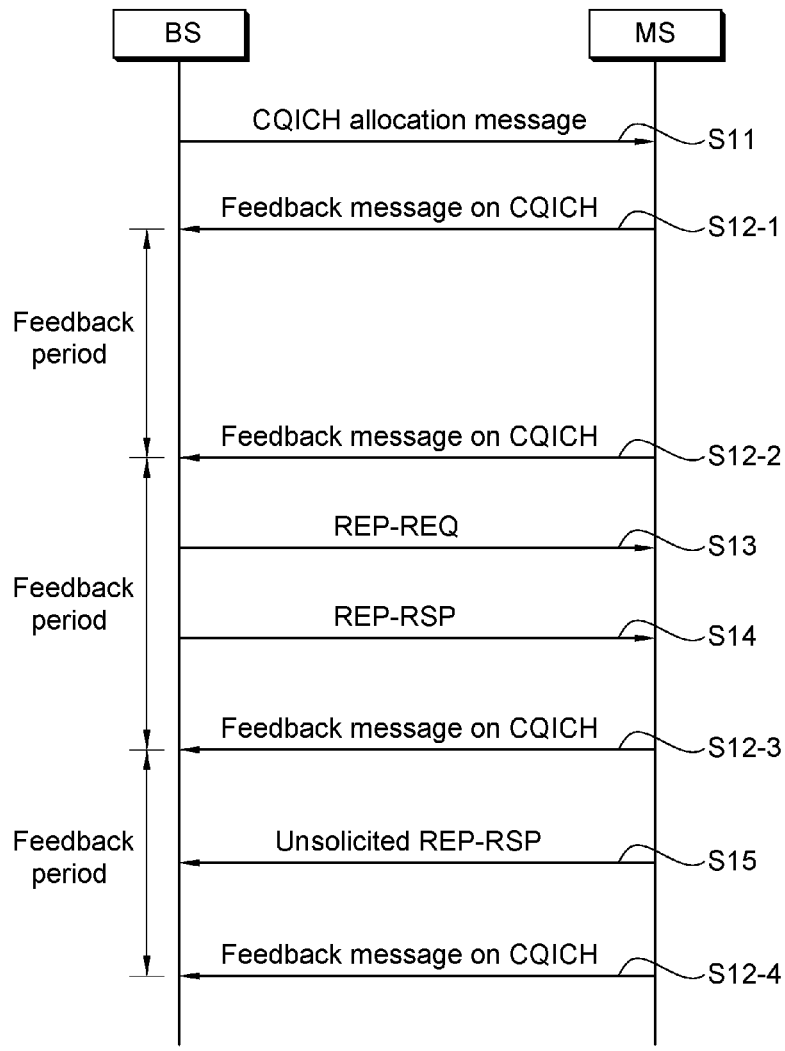
FIG. 4 is an example of a flowchart showing a method of, in the IEEE 802.16e system, an MS transmitting a feedback message for channel information to a BS.

FIG. 4 is an example of a flowchart showing a method of, in the IEEE 802.16e system, an MS transmitting a feedback message for channel information to a BS.

Referring to FIG. 4, a BS transmits a Channel Quality Information CHannel (CQICH) allocation message to an MS at step S11. A fast feedback channel may be used for feedback of the CQICH allocation message. The MS finds channel information by measuring a DL channel. The MS periodically transmits a feedback message for the channel information on the allocated CQICH to the BS at steps S12-1, S12-2, S12-3, and S12-4. The channel information may be Channel Quality Information (CQI). The CQI may have a variety of forms, such as the Signal-to-Noise Ratio (SNR), the Signal-to-Interference-and-Noise Ratio (SINR), the Carrier-to-Interference-and-Noise Ratio (CINR), the Modulation Coding Scheme (MCS) level, the data rate indicator, a received signal strength indicator, etc.

Before the CQICH allocation message is transmitted, the BS and the MS may exchange an SS-Basic Capability Request (SBC-REQ) and an SS-Basic Capability Response (SBC-RSP) with each other. The MS transmits the SBC-REQ to the BS, and the BS transmits the SBC-RSP to the MS in response to the SBC-REQ. Capability negotiation is performed between the MS and the BS through the SBC-REQ and the SBC-RSP. For example, the BS and the MS may check MCS, etc., which can be applied to communication, through the SBC-REQ and the SBC-RSP.

The CQICH allocation message is a control message which is used by the BS in order to dedicatedly allocate a CQICH, which is a control channel for channel information feedback, to the MS. The CQICH allocation message may be included in the UL-MAP message when transmitted. Accordingly, the BS may receive channel information feedbacked from the MS periodically and fast. The CQICH allocation message may include the position of resource on which a feedback message for channel information will be transmitted, a feedback period, duration, a report type, and a feedback type.

Although the BS periodically receives channel information, feedbacked from the MS, using the CQICH allocation message, there may be a case where channel information has to be feedbacked between the feedback periods. Accordingly, there is a need for a method of aperiodically feedbacking the channel information.

The BS may request an aperiodic channel information feedback from the MS using a REPort REQuest (REP-REQ) at step S13. The MS may feedback channel information to the BS using a REPort RESponse (REP-RSP) in response to the REP-REQ at step S14.

If the channel information found by measuring the DL channel does not satisfy a preset reference, the MS transmits an unsolicited REP-RSP to the BS at step S15. The unsolicited REP-RSP may be transmitted on the CQICH.

Figure 5:
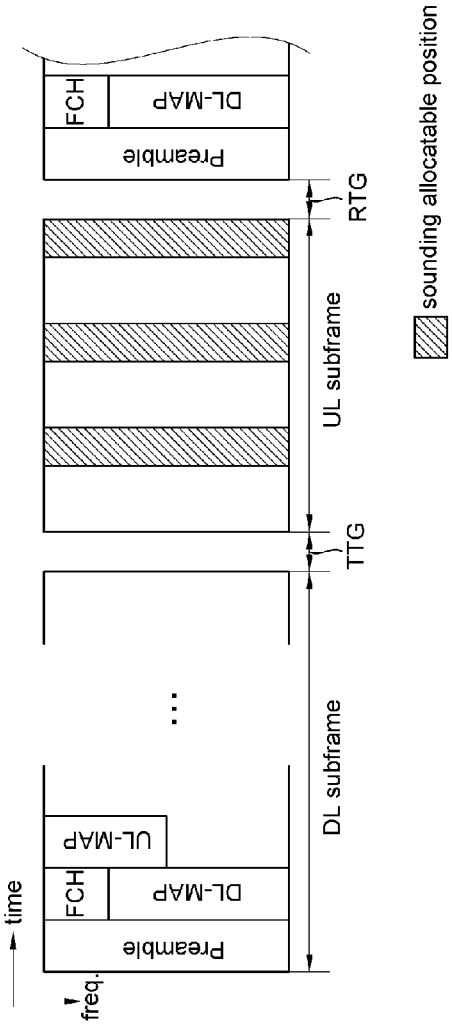
FIG. 5 shows an example of a frame structure in which a sounding signal is transmitted in the IEEE 802.16e system.

FIG. 5 shows an example of a frame structure in which a sounding signal is transmitted in the IEEE 802.16e system. A resource, a transmission method, etc. which are used to transmit a sounding signal may be transmitted through the UL-MAP message. An MS transmits a sounding signal to a BS. The BS may estimate a UL channel state based on the sounding signal. In the TDD method, the BS may indirectly estimate a DL channel state based on the sounding signal, assuming that the characteristic of a UL channel and the characteristic of a DL channel are reciprocal to each other. In the case where channel reciprocity is not established as in the FDD method, the BS may not estimate the DL channel state based on the sounding signal.

In the IEEE 802.16e system, in the case where an MS supports a Channel State Information at the Transmitter (CSIT) and the transmitter and the receiver of a BS have been calibrated, a DL channel state may be estimated based on a sounding signal.

The sounding signal may be transmitted periodically or aperiodically. The sounding signal uses a sequence known to both an MS and a BS. A Pseudo-Random (PN) sequence, a Zadoff-Chu (ZC) sequence, a Constant Amplitude Zero Auto-Correlation (CAZAC) sequence, or a Golay sequence may be used as the sequence for the sounding signal.

A sounding allocatable position, which is a region where a sounding signal can be allocated in a UL subframe, may be plural. The sounding allocatable position may be placed within the last OFDMA symbol(s) of each of the permutation zones of a UL subframe. The permutation zone is a plurality of contiguous OFDMA symbols using the same permutation method in DL or UL.

The sounding signal is transmitted on at least one OFDMA symbol in the sounding allocatable position. A frequency band allocated to transmit the sounding signal may be the whole frequency band or part of a frequency band.

A sounding signal may be transmitted using all subcarriers within the allocated frequency band. In the case where a plurality of users each uses sequence which is orthogonal to each other or sequence which has a low correlation for sounding signal, the sounding signals for the plurality of users may be multiplexed in the same frequency band. For example, each of the plurality of users may use, for the sounding signal, a cyclic shifted sequence which is generated by cyclically shifting a same base sequence in the time domain. To cyclically shift the base sequence in the time domain is same to the multiplication of the base sequence by a phase shift in the frequency domain. Here, the different amount of a cyclic shift (or a different phase shift) may be used for each user.

Alternatively, the sounding signal may be transmitted using only specific subcarriers within the allocated frequency band. It is assumed that there are N (N is a natural number) subcarriers, which is indexed from 1 to N, within the allocated frequency band to transmit the sounding signal. For example, every Dth subcarrier may be used to transmit the sounding signal beginning with a dth subcarrier within the N subcarriers (d and D are natural numbers). Assuming that the subcarrier index used to transmit the sounding signal is k, k satisfies the following equation.

MathFigure 1

$$k \bmod D = d, \ 1 \leq k \leq N \quad [\text{Math.1}]$$

Here, d denotes a starting offset, and D denotes a decimation value. A method of transmitting a sounding signal using only specific subcarriers within the allocated frequency band, as described above, is called subcarrier decimation.

The sounding signals for the plurality of users may be multiplexed by differently allocating starting offsets and decimation values to the respective users within the allocated frequency band. For example, the plurality of users may use the same decimation value, but may use different starting offsets. In this case, subcarriers used to transmit the sounding signals do not overlap with each other among the plurality of users.

Alternatively, the frequency band in which the sounding signals are transmitted may be allocated in the same manner as a method of allocating subcarriers for data transmission. For example, the frequency band in which the sounding signals are transmitted may be allocated by a permutation method, a subchannel offset, and the number of subchannels. The subchannel offset is the lowest index of a subchannel in which the sounding signals are transmitted. The number of subchannels is the number of subchannels used to transmit the sounding signals. Here, scheduling may be performed so that the same subchannel is not allocated to different users.

As described above, the BS may receive channel information feedbacked from the MS or may obtain DL channel information through the sounding signal transmitted by the MS.

However, the feedback of the channel information from the MS may become a method of the BS obtaining DL channel information, but is not suitable for a method of the BS obtaining interference information when a UL signal is received. This is because, in the TDD method, although a UL channel state may be estimated based on DL channel information through channel reciprocity, inter-cell interference is generated differently in UL and DL.

A method of the BS receiving a sounding signal and estimating a UL channel is suitable for a method of obtaining interference information. A reception signal received by the BS is a signal in which an interference signal from a neighbor cell and heat noise have been added to the sounding signal. The BS may obtain the ratio of the sounding signal and the interference signal based on the reception signal. However, the BS cannot know information about from which neighbor cell is the interference signal being generated and how strong is the interference signal being generated based on the reception signal. Accordingly, although interference information is measured based on the sounding signal, scheduling for controlling inter-cell interference is inevitably performed very limitedly.

For example, the BS may allocate a frequency band, having a good SINR, to the MS or may instruct the MS to increase its transmission power so that interference can be overcome and a signal having a desired SINR can be received. However, this scheduling may increase interference, which may affect a neighbor cell, and also cause a problem that the BS does not know whether the increased amount of interference is the amount of interference which can be accommodated in the neighbor cell.

Furthermore, the BS may request a neighbor cell to reduce a resource allocated to a specific frequency band. The specific frequency band may be a frequency band from which interference is estimated to be greatly felt by the BS owing to a low SINR. In this case, the BS cannot know to what degree will be inter-cell interference generated from an MS to which the resource have been allocated to the specific frequency band within the neighbor cell that has received the request. Alternatively, the BS may request the neighbor cell to reduce the transmission power of the MS belonging to the neighbor cell. In this case, the neighbor cell does not have information about to what degree should the transmission power be reduced. The absence of interference information, as described above, may lead for the MS to reduce the transmission power or to be allocated an inadequate frequency band although the MS does not actually generate inter-cell interference in the neighbor cell. This has a problem in that the MS may not use an optimized service.

Accordingly, in order to perform efficient scheduling for controlling inter-cell interference, there is a need for a method of acquiring interference information and a method of transmitting an interference information signal.

Figure 6:
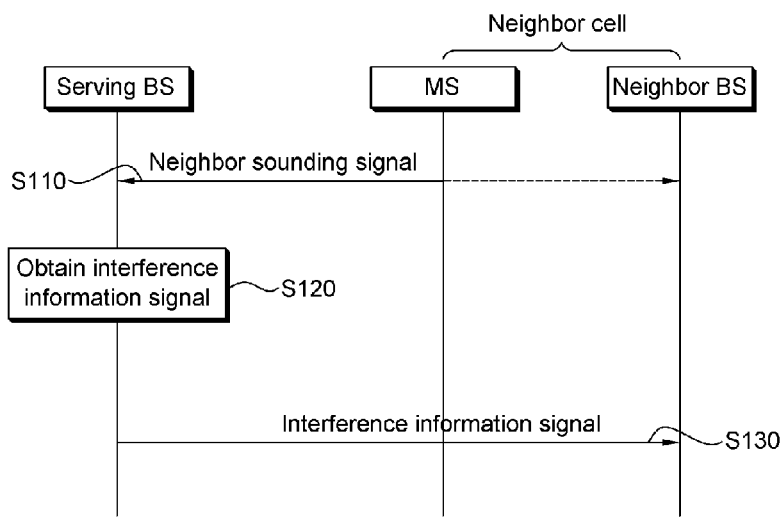
FIG. 6 is a flowchart showing a method of transmitting an interference information signal according to an embodiment of the present invention.

FIG. 6 is a flowchart showing a method of transmitting an interference information signal according to an embodiment of the present invention.

Referring to FIG. 6, a serving BS receives a neighbor sounding signal from an MS in a neighbor cell at step S110. The neighbor sounding signal is a sounding signal received by the serving BS, the sounding signal which is transmitted from the MS in the neighbor cell to a neighbor BS. The serving BS obtains an interference information signal based on the neighbor sounding signal at step S120. The serving BS transmits the interference information signal to the neighbor BS at step S130.

Figure 7:
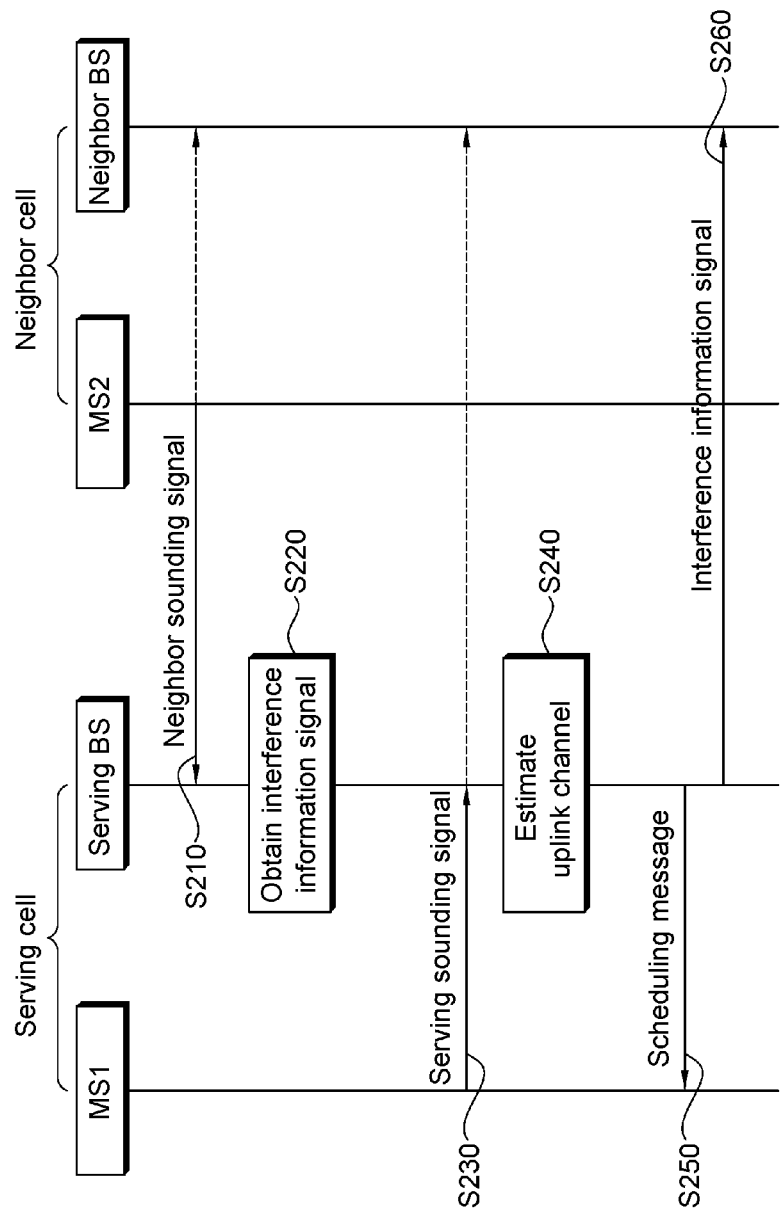
FIG. 7 is a flowchart showing a method of transmitting an interference information signal according to another embodiment of the present invention.

FIG. 7 is a flowchart showing a method of transmitting an interference information signal according to another embodiment of the present invention.

Referring to FIG. 7, a first MS (MS1) belongs to a serving cell, and a second MS (MS2) belongs to a neighbor cell. A serving BS receives a neighbor sounding signal transmitted by the second MS at step S210. The serving BS obtains an interference information signal based on the neighbor sounding signal at step S220. The serving BS may obtain the interference information signal through interference channel estimation based on the neighbor sounding signal. The serving BS receives a serving sounding signal transmitted by the first MS at step S230. The serving sounding signal may be received by not only the serving BS, but also a neighbor BS. The serving BS estimates a UL channel based on the serving sounding signal at step S240. The serving BS may obtain UL channel information through UL channel estimation. The serving BS transmits a scheduling message to the first MS based on the UL channel information and the interference information signal at step S250. The serving BS transmits the interference information signal to the neighbor BS at step S260. In this case, it has been described that the serving BS receives the neighbor sounding signal and the serving sounding signal at different time, but this is only illustrative. For example, the serving BS may receive the neighbor sounding signal and the serving sounding signal at the same time.

Hereinafter, the sounding signal refers to the neighbor sounding signal or the serving sounding signal. The sounding signal may be applied to all the contents of the sounding signal described with reference to FIG. 5.

Each of MSs transmits a sounding signal to a serving BS to which each MS belongs. The serving BS may allocate a resource (i.e., time, a frequency, power, etc.) necessary to transmit the sounding signal, to each MS. Here, the sounding signal transmitted by each MS is transmitted such that the sounding signal is also received by a neighbor BS. The serving BS must be able to identify an MS which has transmitted a sounding signal and must be able to identify a cell to which the MS belongs. To this end, the sounding signal may include a cell IDentifier (ID) and an MS ID. Accordingly, the serving BS that has received the sounding signal can identify the MS that has transmitted the sounding signal and may determine whether the cell to which the MS belongs is a serving cell or a neighbor cell.

The transmission power of a sounding signal may be controlled to a level preset in a wireless communication system in order to accurately measure UL channel information and interference information. The transmission power of the sounding signal may vary depending on the system and cell conditions. If the transmission power of the sounding signal is changed, neighbor cells are informed of information about the transmission power of the sounding signal in advance, so channel information and an interference information signal can be accurately measured.

The sounding signal may be transmitted synchronously or asynchronously. In synchronous transmission, sounding signals are transmitted by all cells in all system or in a specific unit (for example, 1 tier or 2 tier) at the same timing. In this case, the serving BS may precisely measure from which neighbor cell is interference being generated, from which frequency band is the interference being generated, and how strong is the interference being generated. Accordingly, a UL channel state can be accurately measured.

In asynchronous transmission, sounding signals are transmitted by respective cells at different timings. However, when an MS belonging to a neighbor cell transmits a neighbor sounding signal to a serving BS, an MS belonging to a serving cell may transmit a user signal to the serving BS. Since the transmission power of the sounding signal is generally higher than the transmission power of the user signal, the user signal may be subject to in-band interference from the neighbor sounding signal. Accordingly, in the case where a sounding signal is transmitted through asynchronous transmission, attention must be paid to the control of the transmission power of the sounding signal.

Figure 8:
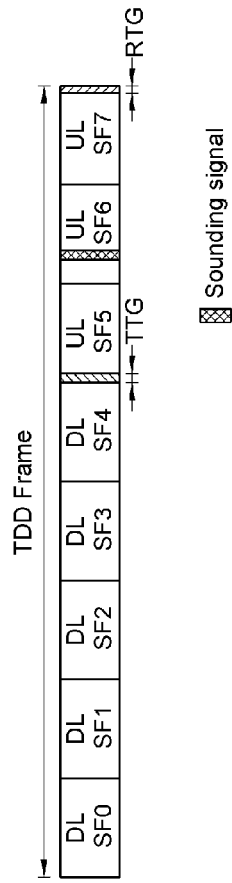
FIG. 8 shows an example of a frame structure in which a sounding signal is transmitted in the IEEE 802.16m system.

FIG. 8 shows an example of a frame structure in which a sounding signal is transmitted in the IEEE 802.16m system. A TDD frame includes eight subframes SF0, SF1, SF2, SF3, SF4, SF5, SF6, and SF7. Each of the subframes may be used for UL or DL transmission. Here, it has been illustrated that the five subframes SF0 to SF4 are DL subframes and the three subframes SF5 to SF7 are UL subframes, but this is only exemplary. Each of the subframes may include a plurality of OFDM symbols. The number of OFDM symbols constituting each of the subframes may differ.

The sounding signal is transmitted through part of the resources of a UL frame. The sounding signal may include an N OFDM symbol (N is a natural number) and an M subcarrier (M is a natural number) in a UL subframe.

In the case of synchronous transmission, resources for sounding signal transmission are identically allocated to each cell. In the case of asynchronous transmission, resources for sounding signal transmission may be differently allocated to respective cells through the exchange of resource allocation information between the cells.

A frequency band for the transmission of a sounding signal in each MS may be influenced by various conditions, such as a multiplexing method, transmission power, etc. The multiplexing method may include a cell multiplexing method and an MS multiplexing method.

Figure 9:
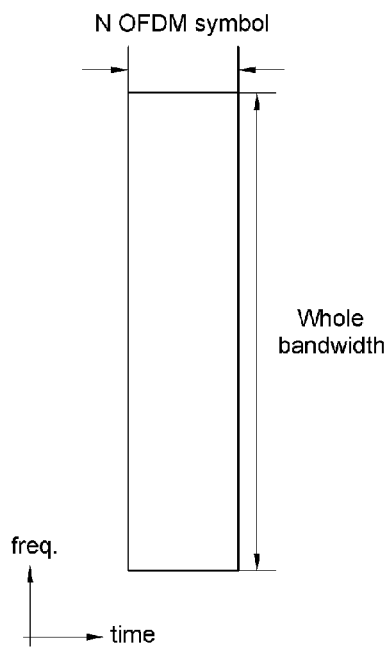
FIG. 9 shows a first example of a method of allocating resources for cell multiplexing and Mobile Station (MS) multiplexing.

FIG. 9 shows a first example of a method of allocating resources for cell multiplexing and MS multiplexing.

Referring to FIG. 9, each MS may transmit a sounding signal through an N OFDM symbol and the whole frequency bandwidth. In this case, cells and MSs are multiplexed using code sets. For example, a different code set may be used every cell. Codes belonging to a code set are orthogonal to each other or have a low correlation. However, the number of codes which are orthogonal to each other or have a low correlation is limited. It is therefore difficult to distinguish both cells and MSs using codes. Furthermore, in the case where an MS transmits a sounding signal through a wide frequency band such as the whole bandwidth, a Power Spectral Density (PSD) is lowered. If the PSD is low, a problem arises because the coverage in which electric waves can reach is decreased. Accordingly, the transmission band of a sounding signal needs to be properly controlled depending on an object to generate the sounding signal and channel conditions.

Figure 10:
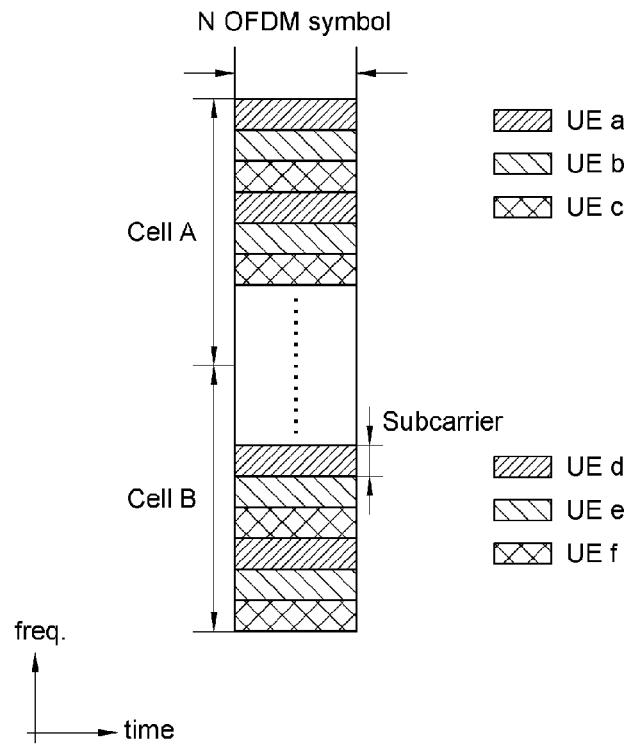
FIG. 10 shows a second example of a method of allocating resources for cell multiplexing and MS multiplexing.

FIG. 10 shows a second example of a method of allocating resources for cell multiplexing and MS multiplexing.

Referring to FIG. 10, each cell uses a different frequency band, and each of a plurality of MSs in the each cell uses a different subcarrier. Cells and MSs are multiplexed using frequency sets.

Figure 11:
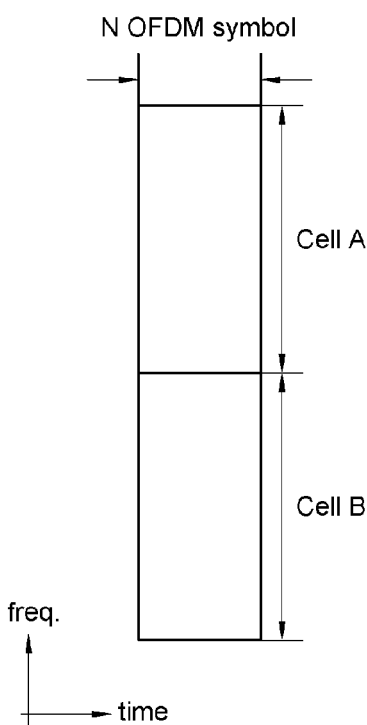
FIG. 11 shows a third example of a method of allocating resources for cell multiplexing and MS multiplexing.

FIG. 11 shows a third example of a method of allocating resources for cell multiplexing and MS multiplexing.

Referring to FIG. 11, respective cells use different frequency bands. A plurality of MSs in each of the cells uses the whole frequency band used by each cell. Each of the plurality of MSs in each of the cell uses different codes. The cells are multiplexed using frequency sets, and the MSs in each cell are multiplexed using a code set. On the contrary, the cells may be multiplexed using a code set, and the MSs in each cell may be multiplexed using frequency sets.

Figure 12:
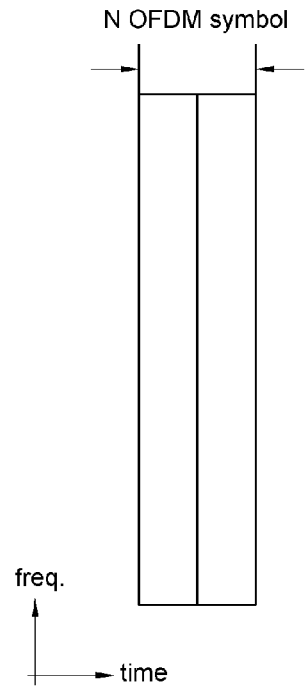
FIG. 12 shows a fourth example of a method of allocating resources for cell multiplexing and MS multiplexing.

FIG. 12 shows a fourth example of a method of allocating resources for cell multiplexing and MS multiplexing.

Referring to FIG. 12, N OFDM symbols are divided into a plurality of symbol groups, and cells and MSs may be multiplexed. In this case, one of the method of multiplexing cells and the method of multiplexing MSs, which have been described with reference to FIGS. 9 to 11, may be used every symbol group.

Figure 13:
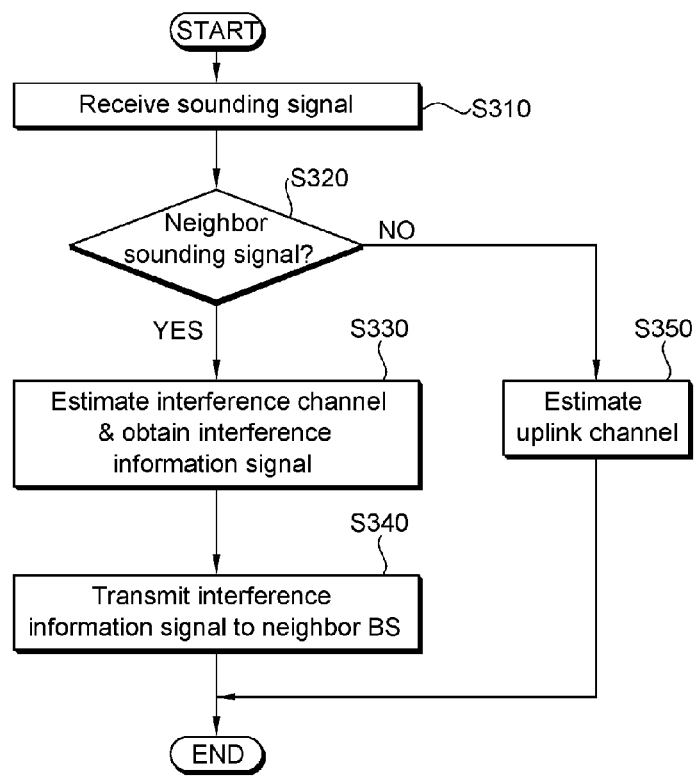
FIG. 13 is an example of a flowchart showing a method of acquiring an interference information signal using a sounding signal.

FIG. 13 is an example of a flowchart showing a method of acquiring an interference information signal using a sounding signal.

Referring to FIG. 13, a serving BS receives a sounding signal from an MS at step S310. The serving BS determines whether the received sounding signal is a neighbor sounding signal at step S320. If, as a result of the determination, the received sounding signal is determined to be a neighbor sounding signal, the serving BS estimates an interference channel based on the neighbor sounding signal and obtains an interference information signal at step S330. The serving BS transmits the interference information signal to a neighbor BS at step S340.

If, as a result of the determination, the received sounding signal is determined not to be a neighbor sounding signal, the received sounding signal is a serving sounding signal. The serving BS estimates a UL channel based on the serving sounding signal at step S350. In the case of the TDD method, the DL channel may be estimated using channel reciprocity.

Figure 14:
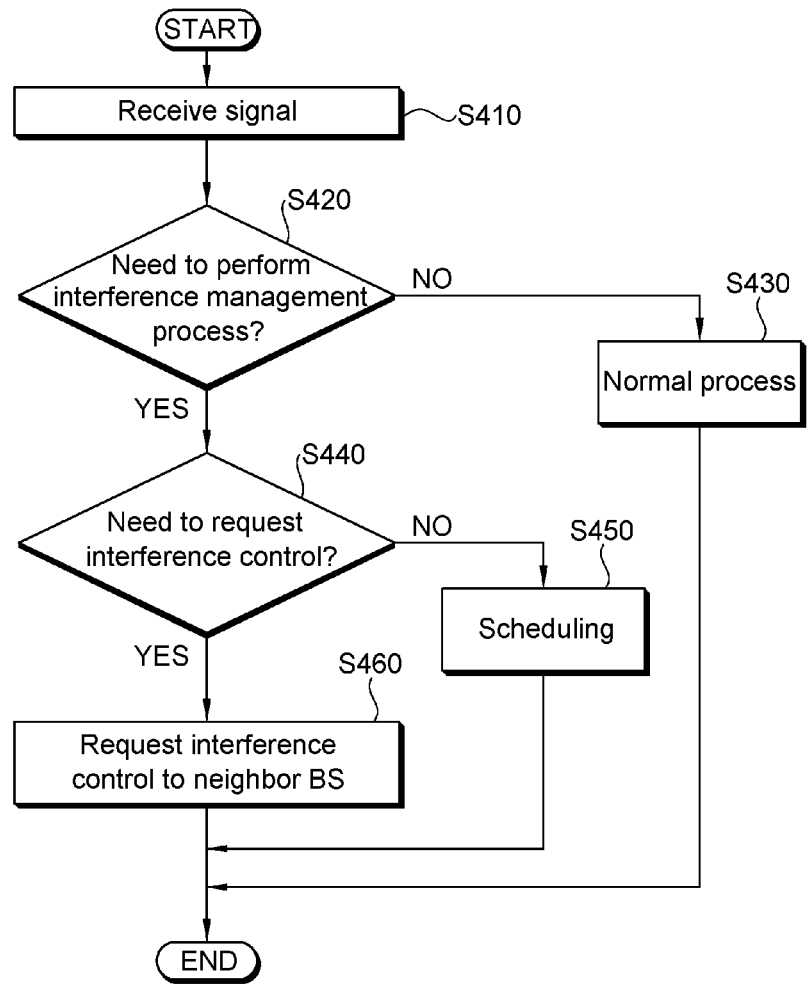
FIG. 14 is an example of a flowchart showing a method of controlling inter-cell interference using an interference information signal.

FIG. 14 is an example of a flowchart showing a method of controlling inter-cell interference using an interference information signal.

Referring to FIG. 14, a serving BS receives a signal at step S410. The signal is a signal in which an interference signal generated by a second MS belonging to a neighbor cell is added to a user signal generated by a first MS belonging to a serving cell. The serving BS determines whether it is necessary to perform an interference management process at step S420. Here, the serving BS may determine whether to perform the interference management process using the service type of the first MS, the interference information signal, etc. If, as a result of the determination, the interference management process needs not to be performed, the serving BS performs a normal process at step S430.

If, as a result of the determination, the interference management process needs to be performed, the serving BS determines whether it is necessary to request interference control to the neighbor BS at step S440. If, as a result of the determination at step S440, the interference control needs not to be requested to the neighbor BS, the serving BS changes a resource, allocated to the first MS, through scheduling at step S450. That is, the interference management process is performed in itself within the serving cell. In the case where the interference management process is performed in itself within the serving cell, the serving BS may not have received any interference control request from any neighbor BS. For example, the serving BS may raise the transmission power of the first MS or allocate a wireless resource, which is different from the existing wireless resource, to the first MS. Accordingly, inter-cell interference can be controlled, and the reception performance of a user signal transmitted by the first MS can be increased in the serving BS.

If, as a result of the determination at step S440, the interference control needs to be requested to the neighbor BS, the serving BS requests interference control to the neighbor BS at step S460.

Figure 15:
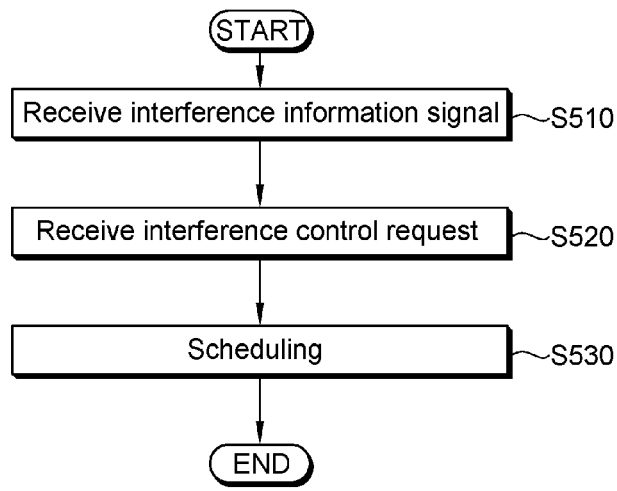
FIG. 15 is a flowchart showing a method of controlling interference according to still another embodiment of the present invention.

FIG. 15 is a flowchart showing a method of controlling interference according to still another embodiment of the present invention.

Referring to FIG. 15, a BS receives an interference information signal from a neighbor BS at step S510. The received interference information signal might have been transmitted by the serving BS at step S340 of FIG. 13. The serving BS of FIG. 13 becomes a neighbor BS from a viewpoint of the BS of FIG. 15.

The BS may know interference information about which MS in a cell to which the BS belongs is causing interference to a neighbor cell to which the neighbor BS belongs from which frequency band and to what degree based on the interference information signal. The BS stores the interference information obtained from the interference information signal.

The BS receives an interference control request from the neighbor BS at step S520. The received interference control request might have been made by the serving BS at step S460 of FIG. 14.

The BS changes a resource, allocated to the MS that generates the interference to the neighbor cell, through scheduling based on the stored interference information at step S530. For example, the BS may decrease the transmission power of the MS or may allocate a wireless resource, which is different from the existing wireless resource, to the MS. Accordingly, inter-cell interference can be controlled, and the reception performance of a UL signal from the neighbor BS can be increased.

As described above, there is provided a method of transmitting an interference information signal in a wireless communication system. Accordingly, an interference signal can be reduced, and the quality of a user signal can be improved.

That is, inter-cell interference can be efficiently controlled, and the performance of the entire system can be improved.

An interference information signal may be obtained based on a sounding signal. The interference information signal may include the following interference information, for example, which cell is subject to interference from which neighbor cell, which first MS in the cell is subject to interference from which second MS in the neighbor cell, and from which resource or to what degree the interference acts on the cell or the first MS. The interference information signal is transmitted to a neighbor BS (i.e., a BS in the neighbor cell). The neighbor BS can know interference information about which MS interferes with which cell, from which resource, and to what degree based on the interference information signal. If the neighbor BS receives the interference control request, the neighbor BS can perform efficient scheduling for interference control based on the interference information.

If the neighbor BS that has received the interference control request does not know which MS generates interference, a problem may arise because, although an MS does not actually generate inter-cell interference, an inadequate frequency band may be allocated to the MS or the SINR may be decreased owing to a reduction in the transmission power. The problem may be solved through the interference information signal.

If the interference information signal is used, the transmission power control of an MS, determined to be an interference source which generates interference, can be precisely controlled. The power control method can be used to more precisely determine transmission power which should be controlled irrespective of delta-based power control or fractional power control.

In the case where an MS must receive interference information signals from neighbor BSs, separate the signals of the BSs from each other, and perform interference control, the MS must perform transmission power control several times depending on the degree of interference being generated by each of the BSs. In this case, problems arise because the signal processing of the MS and hardware complexity are increased. On the other hand, in the method of transmitting an interference information signal according to the present invention, each BS processes interference information signal for an MS and, when interference is generated, calculates transmission power control necessary for the MS. Accordingly, the signal processing of an MS is not increased and hardware complexity can be decreased. Consequently, there is an advantage in that the consumption of the battery of an MS can be reduced.

The method of transmitting an interference information signal has so far been described. Inter-cell interference information can be shared through the transmission of an interference information signal. Here, the interference information signal may be combined with interference information and scheduling information and may be then shared by cells. However, a method of one BS transmitting an interference information signal to the other BS becomes problematic. Hereinafter, a method of sharing an interference information signal between BSs is described. The method of sharing an interference information signal between BSs may be applied to a method of sharing not only an interference information signal, but also other information signals between BSs.

Figure 16:
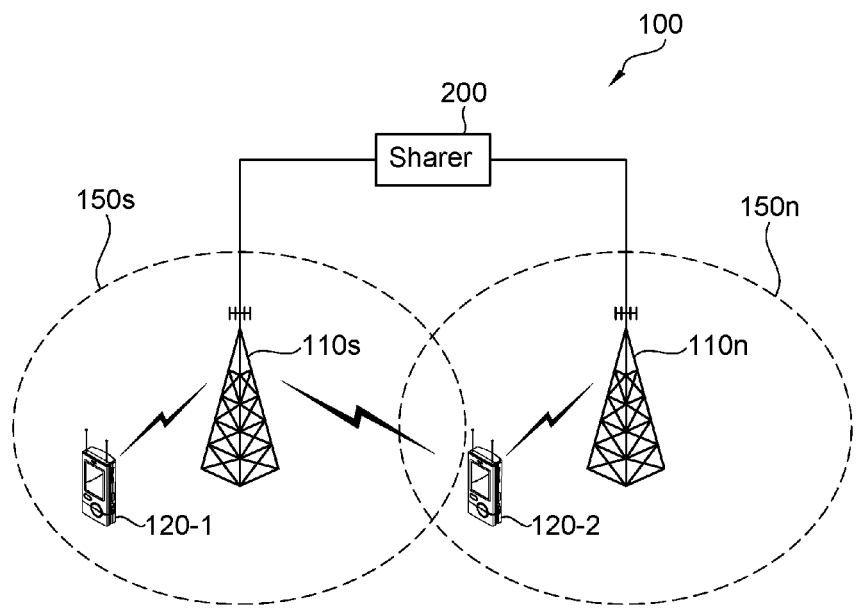
FIG. 16 shows a case where an interference information signal is shared by Base Stations (BSs) using a backbone network.

FIG. 16 shows a case where an interference information signal is shared by BSs using a backbone network.

Referring to FIG. 16, the backbone network connects a serving BS 110s and a neighbor BS 110n through a sharer

200. The sharer 200 may be a router. The remaining contents of FIG. 16 are the same as that described with reference to FIG. 2.

In the LTE system, cells exchange an Overload Indicator (OI) and a High Interference Indicator (HII) with each other using a backbone network. The OI is an interference information signal regarding whether a serving cell is subject to overhead resulting from interference from neighbor cells. The HII is an interference information signal regarding the degree of interference every frequency band.

If the backbone network is used as described above, an information signal can be shared by BSs without restriction to the amount of information. However, time delay may occur in the backbone network because of the causes, such as routing. Further, in the case where an interference information signal is shared over the backbone network, a neighbor cell can know the degree of interference which is felt by a serving cell. It is however not certain whether the MS of the neighbor cell actually participates in the interference.

An interference information signal may be shared by BSs through signaling using an air interface other than the backbone network. Here, the interference information signal may be shared through a UL control channel or a DL control channel.

Figure 17:
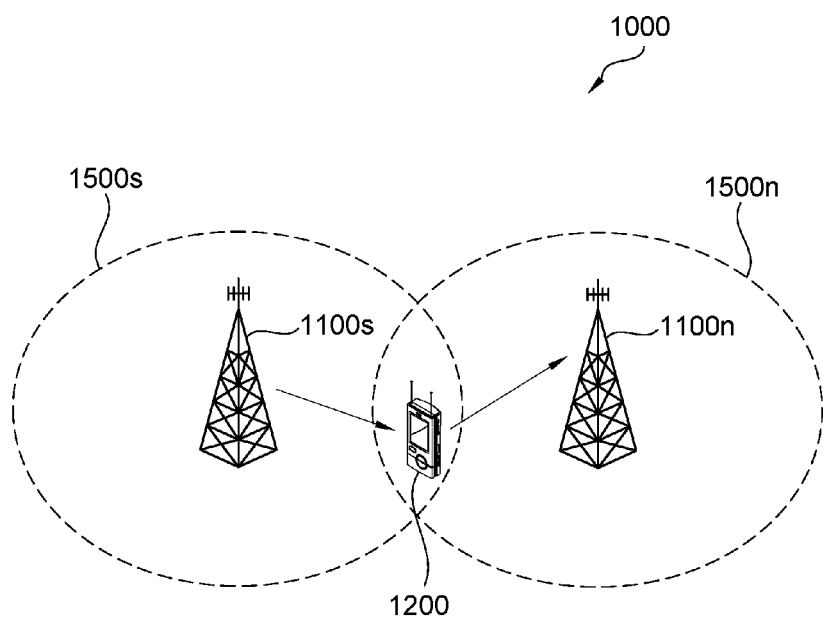
FIG. 17 shows a case where an interference information signal is shared by BSs through an UpLink (UL) control channel.

FIG. 17 shows a case where an interference information signal is shared by BSs through a UL control channel.

Referring to FIG. 17, a wireless communication system 1000 is a cellular system in which a serving cell 1500s and a neighbor cell 1500n exist. An MS 1200 is placed at the boundary between the serving cell 1500s and the neighbor cell 1500n. The MS 1200 receives an interference information signal from a serving BS 1100s and relays the interference information signal to a neighbor BS 1100n.

The MS 1200 may transmit the interference information signal to the neighbor BS 1100n through a UL control channel. In this case, time delay can be reduced if the MS relays the interference information signal to the neighbor cell 1100n without decoding the interference information signal.

In the case where an MS relays an interference information signal between BSs, however, the power consumption of the MS is increased. Further, a UL control channel must be allocated between the MS and a neighbor BS. Moreover, the amount of information which can be transmitted from the MS to the neighbor BS may be limited.

Figure 18:
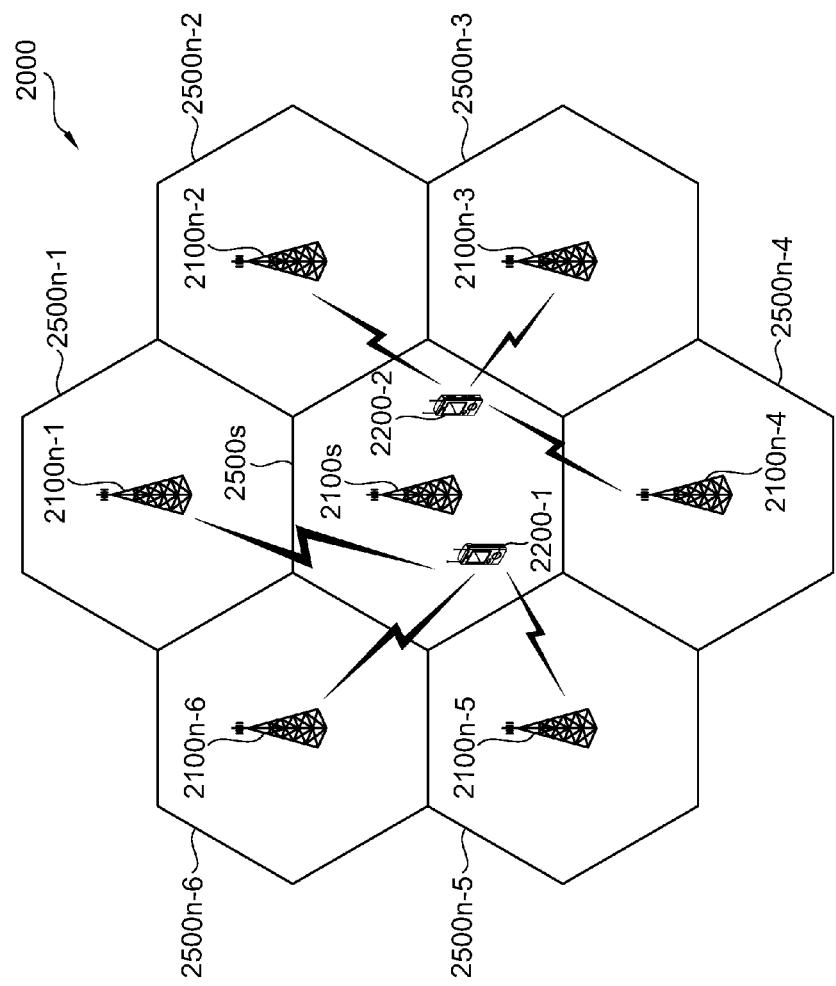
FIG. 18 shows a case where an interference information signal is shared by BSs through a DownLink (DL) control channel.

FIG. 18 shows a case where an interference information signal is shared by BSs through a DL control channel.

Referring to FIG. 18, a wireless communication system 2000 is a cellular system in which a serving cell 2500s and a plurality of neighbor cells 2500n-1 to 2500n-6 exist. Each of neighbor BSs 2100n-1 to 2100n-6 in respective the plurality of respective neighbor cells 2500n-1 to 2500n-6 broadcasts an interference information signal through a DL control channel. MSs 2200-1 and 2200-2 in the serving cell 2500s may receive the interference information signal. The MSs 2200-1 and 2200-2 may know the degree of interference which is felt by the neighbor cells 2500n-1 to 2500n-6 based on the interference information signal and may use the degree of interference for transmission power control. The interference information signal may be broadcasted every preset time.

For example, the interference information signal may be broadcasted every superframe of 20 ms. In the IEEE 802.20 system, the DL control channel may be a Forward-Other Sector Interference Channel (F-OSICH). The interference information signal may be expressed in the three kinds of levels depending on the degree of interference which is felt by each cell. This method does not have problems, such as time delay and power consumption of an MS. In the case where the interference information signal is shared through the F-OSICH, only the degree of interference affecting a neighbor cell can be known. In more detail, in order to know which neighbor cell is subject to interference at which frequency band, a Forward-Interference over Thermal Channel (F-IoTCH) must be decoded.

The interference information signal may include information about the degree of interference and, more particularly, from which frequency band is the interference being generated. In the case where the interference information signal is shared by BSs through signaling using the air interface as in FIG. 17 or 18, however, the size of the interference information signal may be limited because of limited wireless resources. Accordingly, there is a need for a method of reducing the overhead of signaling for the interference information signal.

Figure 19:
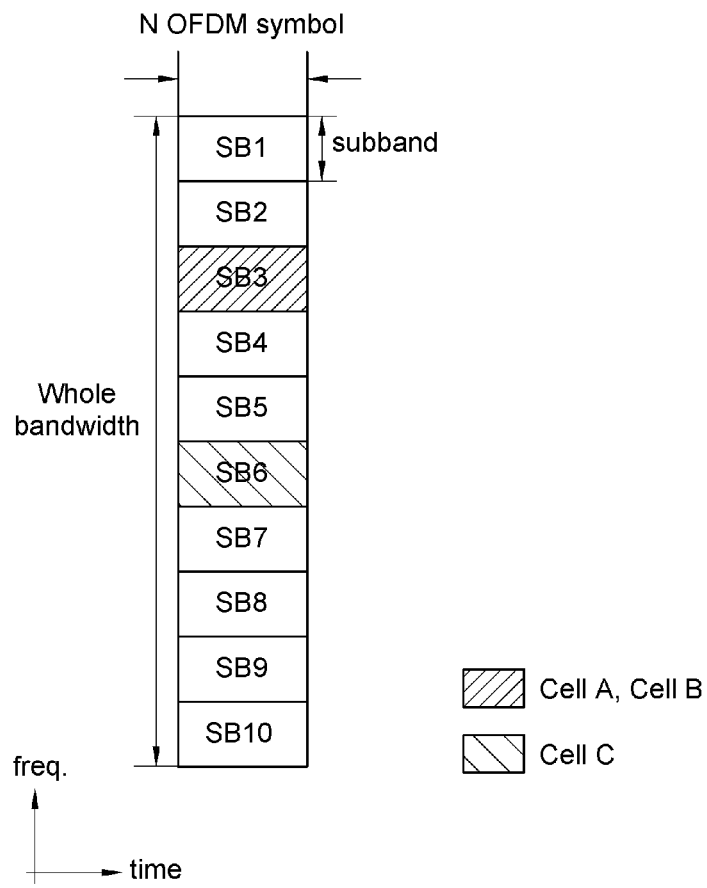
FIG. 19 shows an example of a DL control symbol structure which is capable of reducing the overhead of signaling for an interference information signal.

FIG. 19 shows an example of a DL control symbol structure which is capable of reducing the overhead of signaling for an interference information signal.

Referring to FIG. 19, an interference information signal may be transmitted through an N OFDM symbol (N is a natural number) in the time domain. The interference information signal may be transmitted using one OFDM symbol or a plurality of OFDM symbols with the reception performance and the type of an interference information signal taken into consideration. The whole bandwidth is divided into a plurality of subbands SBs. In an 'SBn' indicating a subband, n denotes the index of each subband. Although the whole bandwidth is illustrated to be divided into 10 subbands, this is only exemplary. Each of the subbands may include a plurality of subcarriers. The subband may be a logical subchannel.

Each cell transmits an interference information signal through a specific subband from which interference is felt by the cell. For example, it is assumed that interference are felt by a cell A and a cell B at a third subband SB3 and interference is felt by a cell C at a sixth subband SB6. Each of the BS A of the cell A and the BS B of the cell B broadcasts respective interference information signals through the third subband SB3, and the BS C of the cell C broadcasts an interference information signal through the sixth subband SB6. Here, each of the cells transmits its interference information signal using respective cell-specific code sequences. Accordingly, the interference information signals of the cell A and the cell B can be distinguished from each other although they are transmitted through the same subband. The code sequences between the cells may be orthogonal to each other or may have a low correlation. Further, the degree of interference may be expressed depending on a method of designing the code sequence.

An MS receives the interference information signals broadcasted by the cells A, B, and C. The MS can know a subbands from which interference is felt by each of the cells based on the respective interference information signals and the degree of interference felt by each of the cells. The MS may directly control the transmission power based on the interference information signals. The MS may also report on the interference information signals to the BS of a cell to which the MS belongs.

Figure 20:
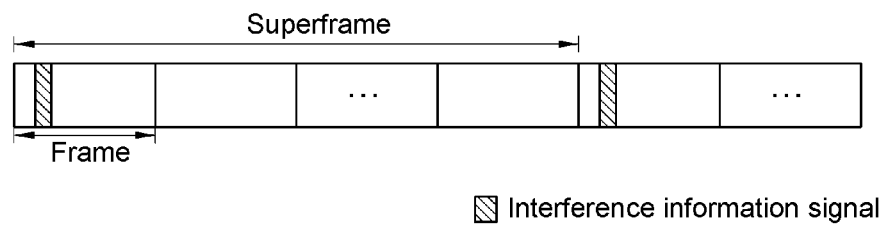
FIG. 20 shows an example of a superframe structure in which an interference information signal is transmitted.

FIG. 20 shows an example of a superframe structure in which an interference information signal is transmitted.

Referring to FIG. 20, a superframe may include a plurality of frames. An interference information signal is transmitted through a preset position within a DL frame. The interference information signal is illustrated to be transmitted every superframe, but this is only exemplary. For example, the interference information signal may be transmitted on a frame-by-frame basis, every integer multiple of a frame, on a superframe-by-superframe basis, or every integer multiple of a superframe. A position on which the interference information signal is transmitted may be synchronized between all cells.

Figure 21:
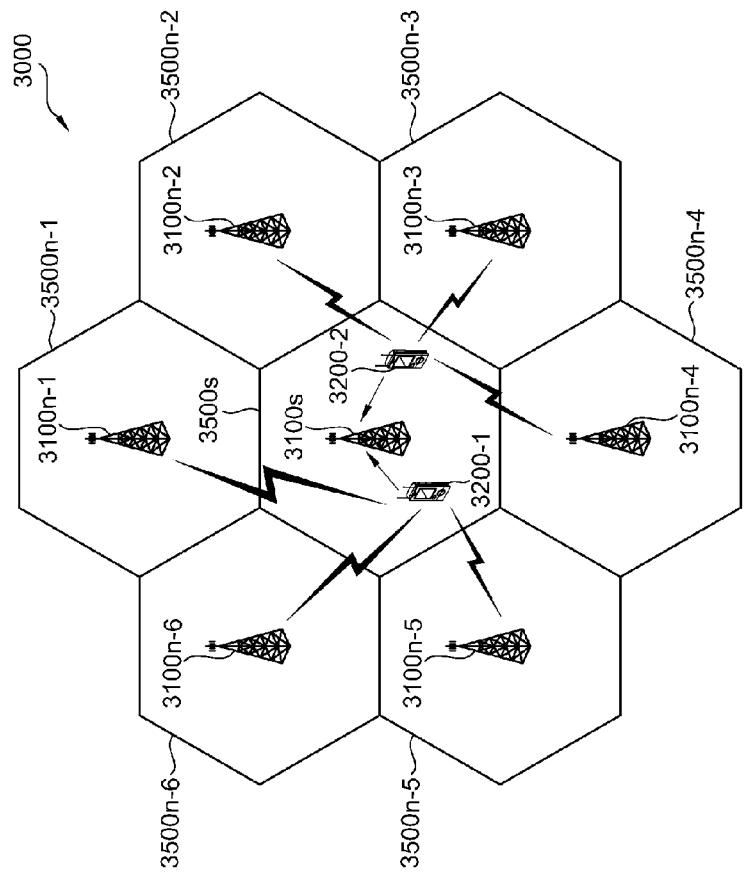
FIG. 21 shows an example of a wireless communication system in which an interference information signal is shared by BSs.

FIG. 21 shows an example of a wireless communication system in which an interference information signal is shared by BSs.

Referring to FIG. 21, a wireless communication system 3000 is a cellular system in which a serving cell 3500s and a plurality of neighbor cells 3500n-1 to 3500n-6 exist. A first MS 3200-1 in the serving cell 3500s receives interference information signals respectively broadcasted by the first, fifth, and sixth neighbor BSs 3100n-1, 3100n-5, and 3100n-6. A second MS 3200-2 in the serving cell 3500s receives interference information signals respectively broadcasted by the second, third, and fourth neighbor BSs 3100n-2, 3100n-3, and 3100n-4. Here, each of the interference information signals is transmitted through a frequency band from which interference is felt by each of the neighbor cells. In each of the neighbor BSs 3100n-1 to 3100n-6, transmission power allocated to the transmission of the interference information signal may be properly selected according to the use of the allocated interference information signal. For example, the transmission power may be allocated the transmission of an interference information signal to the extent that only MSs placed at the boundary between a neighbor cell, transmitting the interference information signal, and a serving cell can receive the interference information signal. Alternatively, greater transmission power may be allocated to the transmission of an interference information signal to the extent that the MSs of a cell, exceeding a 1-tier, can receive the interference information signal.

The serving BS 3100s broadcasts the code sequence information of each of the neighbor cells 3500n-1 to 3500n-6 to all the MSs 3200-1 and 3200-2 in the serving cell 3500s. Each of the MSs 3200-1 and 3200-2 may separate the interference information signals based on the code sequence information of each of the neighbor cells. Accordingly, each of the MSs 3200-1 and 3200-2 may know a frequency band from which interference is felt by each of the neighbor cells. Each of the MSs 3200-1 and 3200-2 may report the interference information signals to the serving BS 3100s.

If an MS searches for interference information signals for a plurality of neighbor cells within a preset period of time, however, it may become overhead for the MS. In order to solve the problem, the following method may be used.

First, an MS may autonomously control search load. Second, a serving BS may control a neighbor cell list which will be searched for by an MS and may broadcast the controlled neighbor cell list to the MS so that the search load of the MS is not great. Alternatively, a subband list which will be searched for by an MS may be broadcasted to the MS. Third, a BS may inform each MS of a neighbor cell list which will be searched for by the MS. Fourth, an MS may search for the same band as a band, used by the MS using resources allocated thereto, or a wider band including the above band.

A period where the BS informs the MS of the neighbor cell list, etc. may be identical to the transmission period of an interference information signal. In the case where each MS reports on the results of receiving the interference information signal to a serving BS, the serving BS may inform the MS of a neighbor cell list on the basis of the report results.

All MSs in a serving cell may receive interference information signals from neighbor cells. In order to reduce the power of an MS, the following two methods may be used.

First, in the case where UL interference information is shared by cells, a serving BS may inform an MS of searching interference information signals based on the UL interference information. Second, in the case where DL interference information is shared by cells, an MS which feels interference in DL may autonomously search for interference information signals.

The MS may report on the search results to the serving BS periodically or aperiodically. In the case where the MS periodically reports on the search results to the serving BS, the report period may be identical to the transmission period of an interference information signal. If the report period differs from the transmission period of an interference information signal, the serving BS may inform the MS of the report period. A message, indicating the report period, may be broadcasted to the MS.

In the case where the MS a periodically reports on the search results to the serving BS, the MS may request a report to the serving BS, receive a response from the serving BS, and then report on the search results to the serving BS. Alternatively, the serving BS may request a report to the MS and, in response thereto, the MS may report on the search results to the BS. The report of the search results is made by only an MS which has performed the search.

As described above, since a BS transmits an interference information signal at a frequency band from which interference is felt by the BS, the interference information signal can be efficiently shared by cells. The method of sharing an interference information signal between cells, which has so far been described, may be applied to a method of sharing not only an interference information signal, but also frequency band-specific information between cells.

For example, each of cells may inform neighbor cells of subbands which will be allocated to respective MSs placed at the boundary between the cells. This may be combined with the FFR method and then used. Alternatively, some OFDM symbols of a plurality of OFDM symbols may be used for the FFR method and the other OFDM symbols of the plurality of the OFDM symbols may be used for the transmission of an interference information signal between cells.

Figure 22:
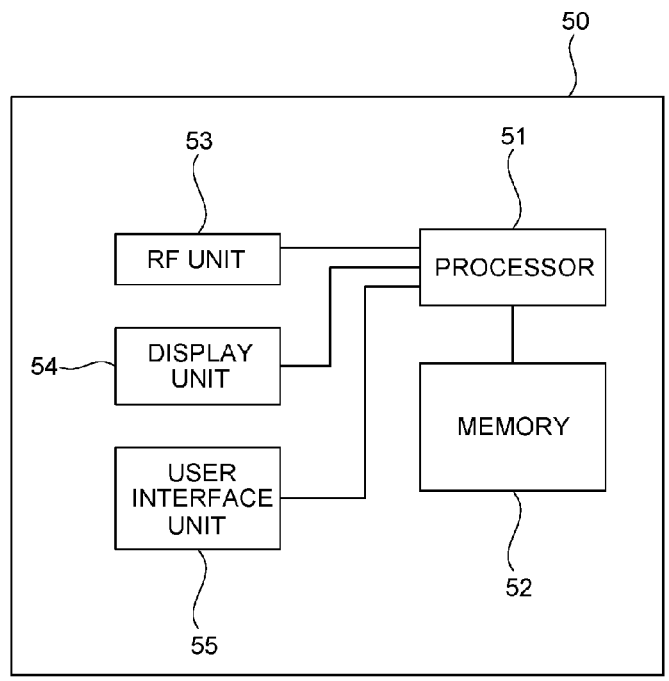
FIG. 22 is a block diagram of an apparatus for wireless communication.

FIG. 22 is a block diagram of an apparatus for wireless communication. The apparatus for wireless communication 50 may be part of an MS. The apparatus for wireless communication 50 includes a processor 51, memory 52, a Radio Frequency (RF) unit 53, a display unit 54, and a user interface unit 55. The RF unit 53 is coupled to the processor 51 and is configured to transmit or receive radio signals. The memory 52 is coupled to the processor 51 and is configured to store an operating system, applications, and general files. The display unit 54 displays various pieces of information of the MS. A well-known device, such as a Liquid Crystal Display (LCD), Organic Light Emitting Diodes (OLEDs), etc., may be used as the display unit 54. The user interface unit 55 may be configured with a combination of well-known user interfaces, such as a keypad, a touch screen, etc. The processor 51 may perform all the above methods regarding the generation and transmission of a sounding signal, the reception of an interference information signal, transmission power control, etc.

Figure 23:
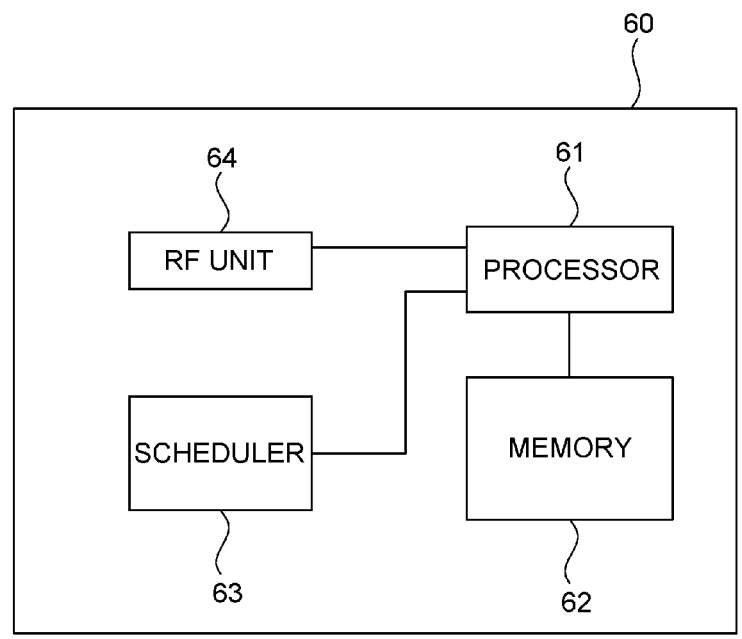
FIG. 23 is a block diagram of an exemplary BS.

FIG. 23 is a block diagram of an exemplary BS. The BS 60 includes a processor 61, memory 62, a scheduler 63, and a RF unit 64. The RF unit 64 is coupled to the processor 61 and is configured to transmit or receive radio signals. The processor 61 may perform all the above methods regarding the reception of a sounding signal and the transmission or reception of an interference information signal. The memory 62 is coupled to the processor 61 and is configured to store pieces of information processed by the processor 61. The scheduler 63 is coupled to the processor 61 and is capable of performing all the above methods regarding scheduling.

All the above functions may be performed by a processor, such as a microprocessor, a controller, a microcontroller, an Application Specific Integrated Circuit (ASIC) according to software or program codes which have been coded to perform the functions. The design, development, and implementation of the codes will be evident to those skill in the art based on the description of the present invention.

While the present invention has been described in connection with what is presently considered to be practical exemplary embodiments, it is to be understood that the present invention is not limited to the embodiments, but, on the contrary, is intended to cover various modifications and equivalent arrangements included within the spirit and scope of the appended claims.

The invention claimed is:

1. A method of transmitting an interference information signal in a wireless communication system, the method comprising the steps of:
   receiving, by a base station, a neighbor sounding signal in a plurality of subbands from a first mobile station that is served by a neighbor cell, each subband including a plurality of subcarriers;
   receiving, by the base station, a serving sounding signal in the plurality of subbands from a second mobile station that is served by a serving cell;
   selecting, by the base station, a subband from the plurality of subbands based on an interference determined based on the serving sounding signal and the neighbor sounding signal; and
   transmitting, by the base station, the interference information signal in the selected subband to the neighbor cell,
   wherein the neighbor sounding signal and the serving sounding signal are received at subcarriers having indexes satisfying:

$k \bmod D = d$ where $1 \leq k \leq N$, N denotes a total number of subcarriers of the plurality of subbands, D denotes a decimation value and d denotes a starting offset, and
   wherein the neighbor sounding signal and the serving sounding signal have a different value of at least one of D and d.

2. The method as claimed in claim 1, wherein the neighbor sounding signal comprises a cell identifier (ID) to identify the neighbor cell and a mobile station ID to identify the first mobile station.

3. The method as claimed in claim 1, wherein the interference information signal comprises information indicating a degree of the interference.

4. The method as claimed in claim 1, wherein the neighbor sounding signal and the serving sounding signal are received at the same time.

5. The method as claimed in claim 1, wherein a subband in which the serving cell observes the interference from the neighbor cell is selected from the plurality of subbands.

6. The method as claimed in claim 5, wherein a subband in which the serving cell observes a highest interference from the neighbor cell is selected from the plurality of subbands.

7. A base station configured to transmit an interference information signal in a wireless communication system, the base station comprising:
   a radio frequency unit configured to receive and transmit radio signals; and
   a processor operably coupled with the radio frequency unit and configured to:
      receive a neighbor sounding signal in a plurality of subbands from a first mobile station that is served by a neighbor cell, each subband including a plurality of subcarriers;
      receive a serving sounding signal in the plurality of subbands from a second mobile station that is served by a serving cell;
      select a subband from the plurality of subbands based on an interference determined based on the serving sounding signal and the neighbor sounding signal; and
      instruct the radio frequency unit to transmit the interference information signal in the selected subband to the neighbor cell,
      wherein the neighbor sounding signal and the serving sounding signal are received at subcarriers having indexes satisfying:

$k \bmod D = d$ where $1 \leq k \leq N$, N denotes a total number of subcarriers of the plurality of subbands, D denotes a decimation value and d denotes a starting offset, and
   wherein the neighbor sounding signal and the serving sounding signal have a different value of at least one of D and d.

8. The base station as claimed in claim 7, wherein a subband in which the serving cell observes the interference from the neighbor cell is selected from the plurality of subbands.

9. The base station as claimed in claim 8, wherein a subband in which the serving cell observes a highest interference from the neighbor cell is selected from the plurality of subbands.

* * * * *